United States Patent
Deak

(10) Patent No.: US 10,471,696 B2
(45) Date of Patent: Nov. 12, 2019

(54) RECOATER BRACKET FOR ADDITIVE MANUFACTURING

(71) Applicant: General Electric Company, Schenectady, NY (US)

(72) Inventor: Stephen Michael Deak, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 15/255,760

(22) Filed: Sep. 2, 2016

(65) Prior Publication Data

US 2018/0065319 A1  Mar. 8, 2018

(51) Int. Cl.
  *B33Y 30/00* (2015.01)
  *B05C 11/02* (2006.01)
  *B29K 105/00* (2006.01)

(52) U.S. Cl.
  CPC ...... *B33Y 30/00* (2014.12); *B29K 2105/0058* (2013.01)

(58) Field of Classification Search
  CPC ........... B05C 7/00; B05C 17/10; B05C 11/10; B05C 11/02; B33Y 30/00; B29C 64/214; B29K 2105/0058
  See application file for complete search history.

(56) References Cited

U.S. PATENT DOCUMENTS

| | | | |
|---|---|---|---|
| 2,913,740 A | 11/1959 | Eldridge | |
| 3,431,585 A | 3/1969 | Foltz | |
| 3,694,072 A * | 9/1972 | Danko, Jr. | G01C 11/00 352/57 |
| 3,952,453 A * | 4/1976 | Amburgey | E01F 13/022 49/34 |
| 4,936,443 A * | 6/1990 | East | B65G 21/06 198/827 |
| 5,089,185 A * | 2/1992 | Hirano | B01J 19/121 156/272.8 |
| 5,529,473 A * | 6/1996 | Lawton | B29C 64/135 425/174.4 |
| 5,592,724 A * | 1/1997 | Linville | A61G 17/04 27/12 |
| 6,175,422 B1 * | 1/2001 | Penn | B33Y 50/00 358/1.1 |
| 6,290,214 B1 | 9/2001 | DeSouza | |
| 7,744,364 B2 | 6/2010 | Turley et al. | |
| 8,356,865 B2 * | 1/2013 | Laible | F25D 25/025 312/334.1 |
| 9,216,544 B2 * | 12/2015 | Swanson | B29C 67/0059 |
| 9,259,850 B2 * | 2/2016 | Hendrickson | B27B 27/02 |
| 2006/0219163 A1 * | 10/2006 | Merot | B05C 11/028 118/100 |

(Continued)

*Primary Examiner* — David P Bryant
*Assistant Examiner* — Lawrence Averick
(74) *Attorney, Agent, or Firm* — General Electric; Kristi Davidson

(57) ABSTRACT

A mounting apparatus for a recoater rail of an additive manufacturing machine includes: a bracket including: a body having first and second ends; first and second flanges extending from the first and second ends respectively, the body and flanges cooperatively forming a C-shape; a first jack screw mounted to the first flange, the first jack screw extending parallel to the body; and a second jack screw mounted to the second flange, the second jack screw extending parallel to the body.

17 Claims, 4 Drawing Sheets

(56) References Cited

U.S. PATENT DOCUMENTS

| | | | |
|---|---|---|---|
| 2007/0075461 A1* | 4/2007 | Hunter | B29B 13/02 264/401 |
| 2008/0181977 A1* | 7/2008 | Sperry | B29C 64/106 425/90 |
| 2009/0217697 A1* | 9/2009 | Laible | F25D 25/025 62/449 |
| 2011/0089610 A1* | 4/2011 | El-Siblani | B29C 33/44 264/401 |
| 2013/0140741 A1* | 6/2013 | El-Siblani | B29C 33/44 264/401 |
| 2013/0174705 A1* | 7/2013 | Hendrickson | B27B 27/02 83/441.1 |
| 2014/0178588 A1* | 6/2014 | Swanson | B29C 67/0059 427/288 |
| 2014/0265034 A1* | 9/2014 | Dudley | B33Y 10/00 264/401 |
| 2015/0217519 A1* | 8/2015 | Otten | B29C 67/0088 264/40.1 |
| 2017/0021562 A1* | 1/2017 | El-Siblani | B29C 33/44 |

* cited by examiner

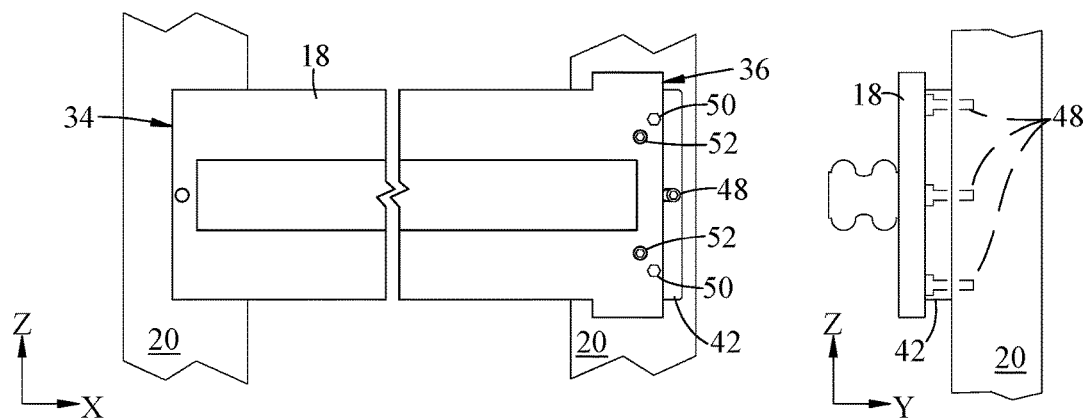
FIG. 2
(PRIOR ART)
FIG. 3
(PRIOR ART)
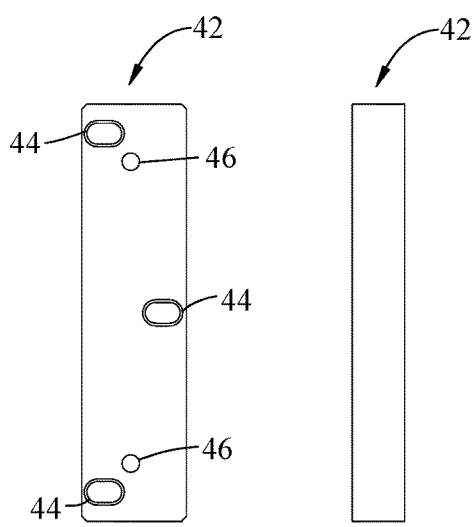
FIG. 4
(PRIOR ART)
FIG. 5
(PRIOR ART)

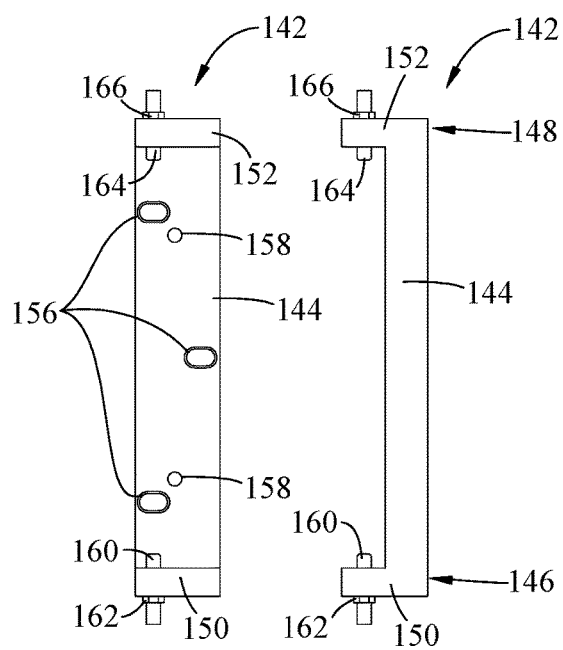
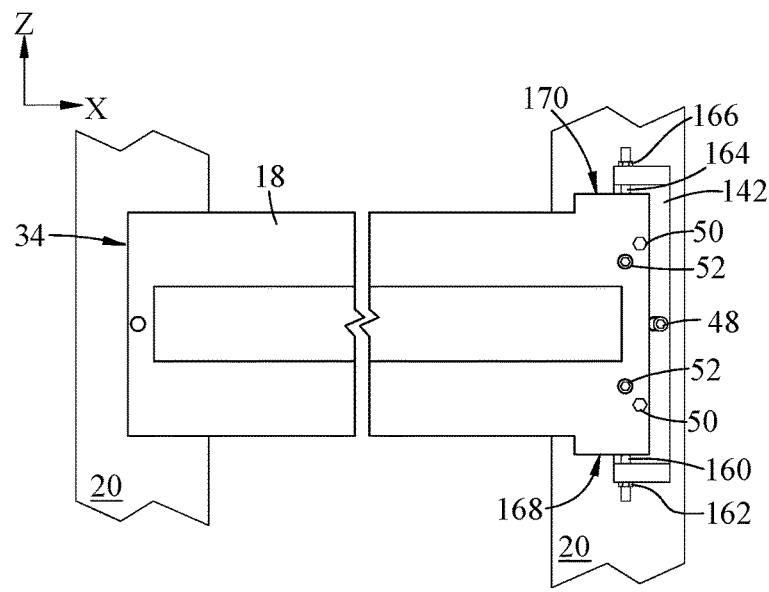 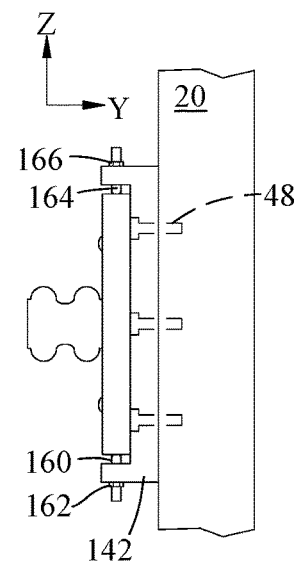
FIG. 6    FIG. 7
FIG. 8    FIG. 9

RECOATER BRACKET FOR ADDITIVE MANUFACTURING

BACKGROUND OF THE INVENTION

This invention relates generally to additive manufacturing, and more particularly to apparatus and for recoater alignment and support.

Additive manufacturing is a process in which material is built up layer-by-layer to form a component. Additive manufacturing is limited primarily by the position resolution of the machine and not limited by requirements for providing draft angles, avoiding overhangs, etc. as required by casting. Additive manufacturing is also referred to by terms such as "layered manufacturing," "reverse machining," "direct metal laser melting" (DMLM), and "3-D printing". Such terms are treated as synonyms for purposes of the present invention.

Several existing types of additive manufacturing machines utilize a scraper-like device referred to as a "recoater" which is used to spread and level a starting material prior to the material being selectively solidified.

One problem with prior art recoaters is that they can deviate from the intended straight, level configuration. For example, the weight of the recoater cantilevered from a supporting rail can cause the recoater rail to twist. Furthermore, the recoater rail can bend in either a convex up shape ("arch") or a convex down shape ("droop").

BRIEF DESCRIPTION OF THE INVENTION

This problem is addressed by a mounting bracket which includes one or more jack screws positioned to adjust the position of a recoater rail.

According to one aspect of the technology described herein, a mounting apparatus for a recoater rail of an additive manufacturing machine includes: a bracket including: a body having first and second ends; first and second flanges extending from the first and second ends respectively, the body and flanges cooperatively forming a C-shape; a first jack screw mounted to the first flange, the first jack screw extending parallel to the body; and a second jack screw mounted to the second flange, the second jack screw extending parallel to the body.

According to another aspect of the technology described herein, a method of upgrading a recoater rail in an additive manufacturing machine includes: removing a pre-existing mounting bracket which interconnects a recoater rail and a frame member of the additive manufacturing machine; positioning a revised mounting bracket between the recoater rail and the frame member, the revised mounting bracket comprising: a body having first and second ends; first and second flanges extending from the first and second ends respectively, the body and flanges cooperatively forming a C-shape; and a first jack screw mounted to the first flange, the first jack screw extending parallel to the body; and a second jack screw mounted to the second flange, the second jack screw extending parallel to the body; and securing the revised mounting bracket to the recoater rail and the frame member with the recoater rail between the first and second jack screws.

BRIEF DESCRIPTION OF THE DRAWINGS

The invention may be best understood by reference to the following description taken in conjunction with the accompanying drawing figures in which:

FIG. 2 is a schematic, front elevation view of a prior art recoater rail and a mounting bracket for use with the machine of FIG. 1;

FIG. 3 is a side view of the recoater rail and mounting bracket of FIG. 2;

FIG. 4 is a front elevation view of a prior art mounting bracket;

FIG. 5 is a side view of the mounting bracket of FIG. 4;

FIG. 6 is a front elevation view of a mounting bracket for use with the machine of FIG. 1;

FIG. 7 is a side view of the mounting bracket of FIG. 5;

FIG. 8 is a front elevation view showing the mounting bracket of FIG. 5 coupled to a recoater rail;

FIG. 9 is a side view of the recoater rail and mounting bracket of FIG. 8; and

DETAILED DESCRIPTION OF THE INVENTION

Figure 1:
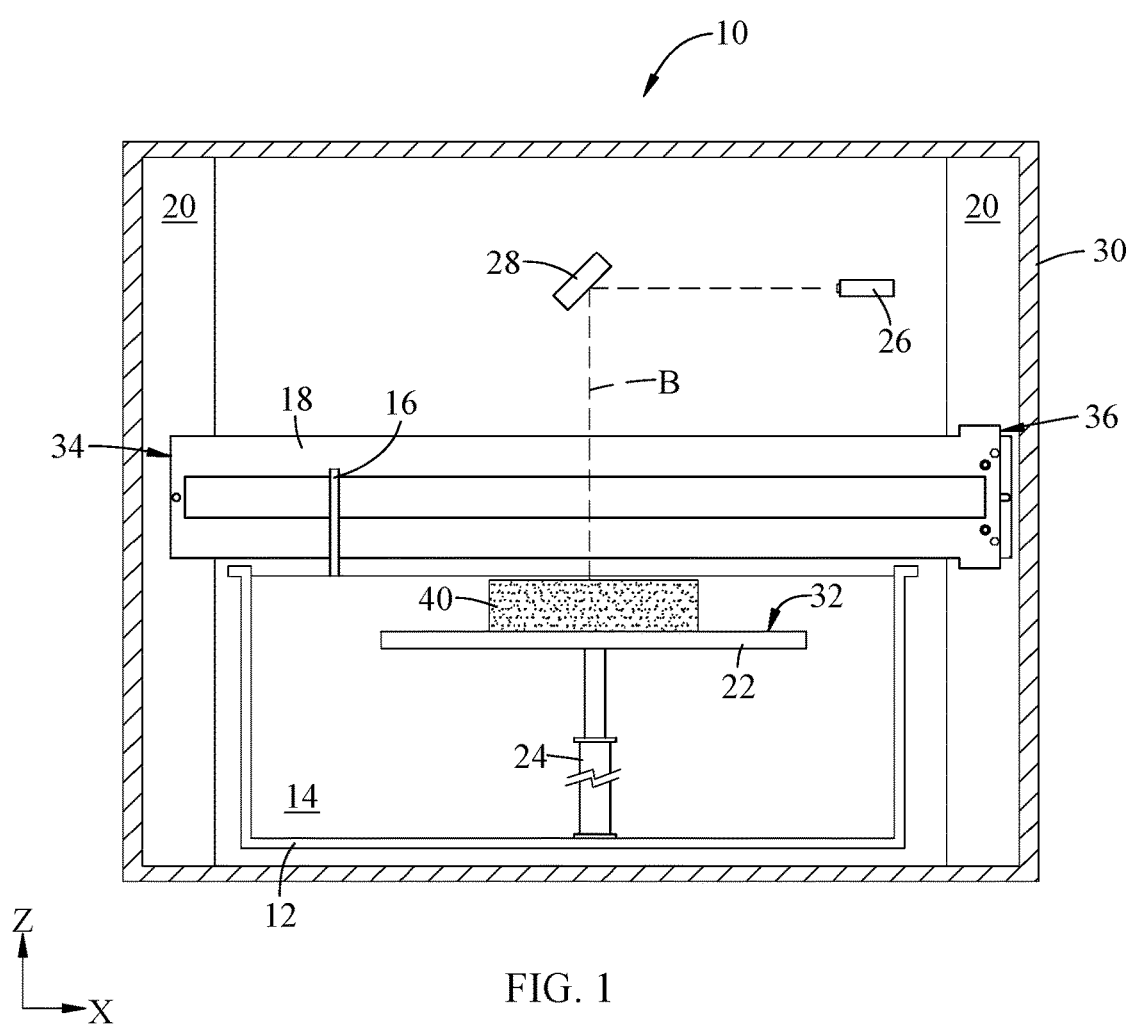
FIG. 1 is a schematic, partially-sectioned front elevation view of an exemplary additive manufacturing machine.

Referring to the drawings wherein identical reference numerals denote the same elements throughout the various views, FIG. 1 illustrates schematically an additive manufacturing machine 10 suitable for carrying out an additive manufacturing method.

The machine 10 and its operation are as representative example of a stereolithography machine, also referred to as a "3-D printing machine". It will be understood that the principles described here are applicable to other configurations of additive manufacturing machines, for example other configurations of stereolithography machines, as well as powder bed machines.

Basic components of the machine 10 include a vat 12 containing uncured liquid resin 14, a recoater 16 mounted to a recoater rail 18 which is in turn mounted to frame members 20, a build platform 22 carried by an actuator 24, a directed energy source 26, and a beam steering apparatus 28, all surrounded by a housing 30. Each of these components will be described in more detail below.

The build platform 22 is a rigid structure defining a planar worksurface 32. For purposes of convenient description, the plane of the worksurface 32 is oriented parallel to an X-Y plane of the machine 10, and a direction perpendicular to the X-Y plane is denoted as a Z-direction (X, Y, and Z being three mutually perpendicular directions). The Z-direction or Z-axis may also be referred to herein as a "build axis".

The actuator 24 is operable to move the build platform 22 parallel to the Z-direction. It is depicted schematically in FIG. 1, with the understanding devices such as pneumatic or hydraulic cylinders, ballscrew or linear electric actuators, and so forth, may be used for this purpose.

The recoater 16 is a rigid, laterally-elongated structure (similar to a blade or scraper) that extends over the vat 12. It is connected to an actuator 38 operable to selectively move the recoater 16 along the recoater rail 18.

The recoater rail 18 has left and right ends 34, 36 respectively. The left end 34 is pinned to one of the frame members 20 so that it can pivot about the Y axis. As will be explained in more detail below, the right end 36 is mounted in such a way that the orientation of the recoater rail 18 can be adjusted.

The directed energy source 26 may comprise any device operable to generate a beam of suitable power and other operating characteristics to melt and fuse the resin 14 during the build process, described in more detail below. For example, the directed energy source 26 may be a laser.

The beam steering apparatus 28 may include one or more mirrors, prisms, and/or lenses and provided with suitable actuators, and arranged so that a beam "B" from the directed energy source 26 can be focused to a desired spot size and steered to a desired position in plane coincident with the worksurface 32. The beam B may be referred to herein as a "build beam".

Generically, a build process using the machine 10 begins by positioning the platform 16 just below the surface of the resin 14, thus defining a selected layer increment. The recoater 16 is moved across the surface of the vat 12 to spread the resin 14 evenly over the build platform 22.

The directed energy source 26 emits a beam B and the beam steering apparatus 28 is used to scan the build beam B across the surface of the resin 14. When contacted by the radiant energy, polymerization of the polymeric liquid resin 14 is initiated such that cross-linking of the polymer occurs at the intersection of the radiant energy and the liquid polymer. As the radiant energy contacts the surface of the resin 14, a layer of solid polymeric material is formed.

The build platform 22 is lowered such that it is further away from the surface of the resin 14 and a layer of liquid resin is formed over the solid structure formed in the previous pass, after each pass. During subsequent passes the solid polymeric material is formed on the previously built layer of material. In this manner, the resin 14 is converted to a solid part 40 that is positioned on the surface of the build platform 22

To ensure accuracy of the build process described above, the recoater rail 18 has to be accurately positioned and oriented. In operation the recoater rail 18 is intended to be straight and level (that is, parallel to the X-Y plane). However, it can deviate in several ways. For example, the weight of the recoater 16 cantilevered from the recoater rail 18 can cause the recoater rail 18 to twist, i.e. one end of the recoater rail 18 can rotate about the X axis. Furthermore, the recoater rail 18 can bend in either a convex up shape ("arch") or a convex down shape ("droop").

FIGS. 2-5 illustrate a prior art mounting bracket 42 and its use. The mounting bracket 42 consists essentially of a slab or plate having frame mounting slots 44 formed therein, as well as female threaded rail mounting holes 46.

As seen in FIGS. 2 and 3, the mounting bracket 42 is secured to the right-hand frame member 20 using screws 48 or other conventional fasteners passing through the fame mounting The right end 36 of the recoater rail 18 is in turn mounted to the mounting bracket 42 using clamp screws 50. A pair of spaced-apart adjustment screws 52 extend through the recoater rail 18 and contact the mounting bracket 42.

The recoater rail 18 may be adjusted to make it level by loosening the clamp screws 50, changing the height (i.e. Z axis position) of the right end 36, and re-tightening the clamp screws 50. This adjustment can be complex and inconvenient, because the weight of the recoater rail 18 is unsupported when the clamp screws 50 are loosened.

The recoater rail 18 may be adjusted to compensate for twist by differentially adjusting the two spaced-apart adjustment screws 52, or by using shims (not shown) between the recoater rail 18 and the mounting bracket 42. There is no provision for adjusting for arching or drooping of the recoater rail 18.

FIGS. 6-8 illustrate a replacement mounting bracket 142 and its use. The mounting bracket 142 includes a plate-like body 144 with lower and upper ends 146, 148 respectively. A lower flange 150 extends from the lower end 146 and an upper flange 152 extends from the upper end 148. Collectively, the body 144 and the flanges 150, 152 define a shallow C- or U-shape. Frame mounting slots 156 are formed through the body 144, as well as female threaded rail mounting holes 158.

The mounting bracket 142 is configured to be a direct replacement for the prior art mounting bracket 42 described above. Specifically, the shape and dimensions of the replacement mounting bracket 142 are selected to fit in the same interface volume and to be mounted using the same apparatus as the prior art mounting bracket 42. For example, the frame mounting slots 156 and the rail mounting holes 158 are located in the same relative positions as those of the prior art mounting bracket 42.

The mounting bracket 142 includes at least one vertical jackscrew. in the illustrated example, a lower jackscrew 160 is mounted in a female threaded hole in the lower flange 150, and is provided with a jam nut 162. An upper jackscrew 164 is mounted in a female threaded hole in the upper flange 152, and is provided with a jam nut 166. The two jackscrews 160, 164 may be disposed coaxial to each other. When assembled, the jack screws 160, 164 bear against lower and upper surfaces 168, 170 respectively, of the recoater rail 18.

As seen in FIGS. 8 and 9, the mounting bracket 142 is secured to the right-hand frame member 20 using screws 48 or other conventional fasteners. The right end 36 of the recoater rail 18 is in turn mounted to the mounting bracket 142 using clamp screws 50.

The recoater rail 18 may be adjusted to make it level (or parallel to the X-Y plane) by loosening the clamp screws 50, then using the jack screws 160, 164 to change the height (i.e. Z-axis position) of the right end 36, optionally locking the adjustments with the jam nuts 162, 166, and re-tightening the clamp screws 50. this adjustment is simple and convenient, because the weight of the recoater rail 18 is supported by the jack screws 160, 164 when the clamp screws 50 are loosened.

The recoater rail 18 may be adjusted to compensate for twist by differentially adjusting the adjustment screws 52, or by using shims (not shown) between the recoater rail 18 and the mounting bracket 142.

Figure 10:
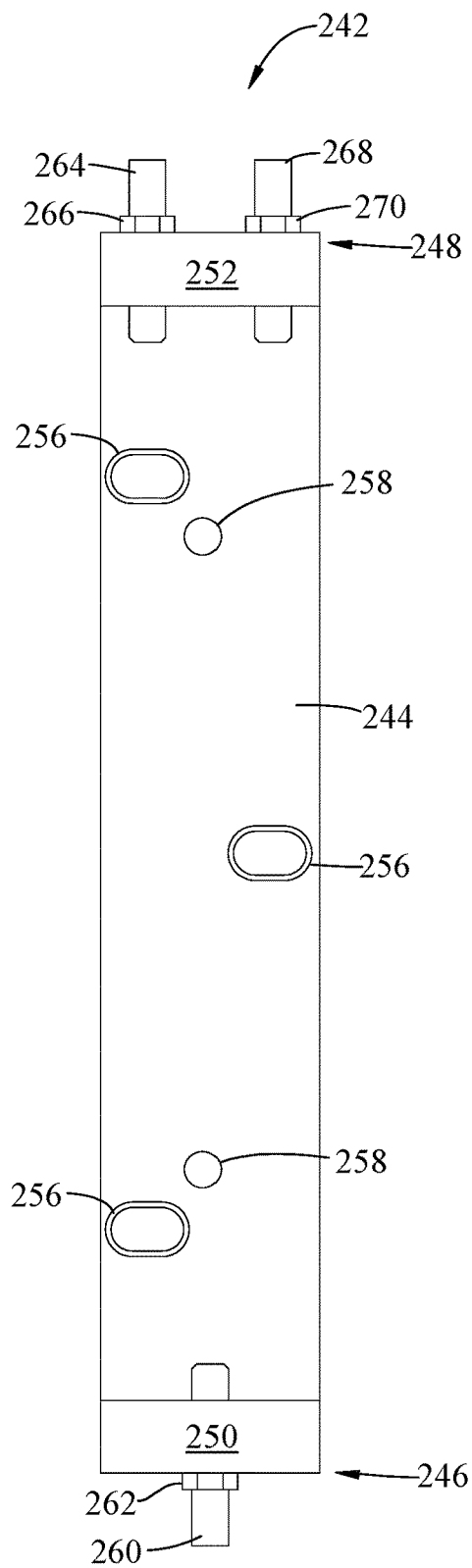
FIG. 10 is a front elevation view of an alternative mounting bracket.

The mounting bracket 142 does not include a specific provision to compensate for arching or drooping of the recoater rail 18. FIG. 10 illustrates an alternative mounting bracket 242 which includes means for this adjustment. The mounting bracket is similar in construction to the mounting bracket 142 and elements not specifically described may be considered to be identical to the mounting bracket 142. The mounting bracket 242 includes a body 244 with lower and upper flanges 250, 252 extending from lower and upper ends 246, 248 respectively. Frame mounting slots 256 are formed through the body 244, as well as female threaded rail mounting holes 258.

The mounting bracket 242 includes three vertical jack screws, with two of the jack screws grouped at the upper or lower end 246, 248 of the body 244, and the third jack screw at the opposite end of the body 244. in the illustrated example, a lower jackscrew 260 is mounted in a female threaded hole in the lower flange 250, and is provided with a jam nut 262. A first upper jackscrew 264 is mounted in a female threaded hole in the upper flange 252, and is provided with a jam nut 266. A second upper jackscrew 268 is mounted in a female threaded hole in the upper flange 254, and is provided with a jam nut 270. The three jack screws 260, 264, 268 may all be aligned parallel to each other. The lateral position of the lower jackscrew 260 (i.e. X-axis position) may be halfway between the lateral positions of the upper jack screws 264, 268.

When assembled, the lower jack screw 260 bears the lower surface 168 of the recoater rail, and the upper jack screws 264, 268 bear against the upper surface 170 of the recoater rail 18.

Assembly of the mounting bracket 242 is similar to that of the mounting bracket 142 described above. The recoater rail 18 may be adjusted to make it level (or parallel to the X-Y plane) by loosening the clamp screws 50, then using the jack screws 260, 264, 268 to change the height (i.e. Z-axis position) of the right end 36, optionally locking the adjustments with the jam nuts 262, 266, and 270, and re-tightening the clamp screws 50. For example, the upper jack screws 264, 268 may be adjusted in unison with each other and in concert with an equal and opposite adjustment of the lower jack screw 260, resulting in a pure Z-axis movement of the right end 36.

The upper jack screws 264, 268 may be adjusted differentially to apply a bending moment to the recoater rail 18 and thereby compensate for an arching or drooping of the recoater rail 18. For example, if the second upper jack screw 268 extends further downward than the first upper jack screw 264, this would tend to cause an arching (convex upward) bending moment in the recoater rail 18.

The mounting bracket described herein has several advantages over the prior art. In particular, it allows provides simple, consistent adjustment of the recoater rail 18. This has the potential to reduce workpiece variation and scrap rate, and improve part quality. The mounting bracket can be used to directly replace an existing mounting bracket with no changes to the additive manufacturing machine.

The foregoing has described an apparatus and method for mounting a recoater rail in an additive manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A mounting apparatus for a recoater rail of an additive manufacturing machine, comprising:
   a bracket including:
      a body having first and second ends;
      first and second flanges extending from the first and second ends respectively, the body and flanges cooperatively forming a C-shape;
      a first jack screw mounted to the first flange, the first jack screw extending parallel to the body and terminating at a free end adapted to bear against a lower surface of a recoater rail;
      a second jack screw mounted to the second flange, the second jack screw extending parallel to the body and terminating at a free end adapted to bear against an upper surface of the recoater rail; and
      a third jack screw mounted to the second flange, wherein the second and third jack screws are spaced apart from each other and extend parallel to the body.

2. The apparatus of claim 1 wherein the first and second jack screws are oriented coaxial to each other.

3. The apparatus of claim 1 wherein the first, second, and third jack screws are oriented parallel to each other.

4. The apparatus of claim 1 wherein the first jack screw is disposed halfway between the second and third jack screws.

5. The apparatus of claim 1 further comprising at least one female threaded rail mounting hole formed through the body.

6. The apparatus of claim 1 further comprising frame mounting slots formed in the body.

7. The apparatus of claim 1 wherein the recoater rail includes first and second ends, the first end being received between the free ends of the first and second jack screws of the mounting bracket.

8. The apparatus of claim 7 wherein the second end of the recoater rail is pivotally mounted to a first frame member of an additive manufacturing machine.

9. The apparatus of claim 7 further comprising a blade-like recoater mounted to the recoater rail.

10. A method of upgrading a recoater rail in an additive manufacturing machine, comprising:
    removing a pre-existing mounting bracket which interconnects a recoater rail and a frame member of the additive manufacturing machine;
    positioning a revised mounting bracket between the recoater rail and the frame member, the revised mounting bracket comprising:
       a body having first and second ends;
       first and second flanges extending from the first and second ends respectively, the body and flanges cooperatively forming a C-shape; and
       a first jack screw mounted to the first flange, the first jack screw extending parallel to the body and terminating at a free end adapted to bear against a lower surface of a recoater rail;
       a second jack screw mounted to the second flange, the second jack screw extending parallel to the body and terminating at a free end adapted to bear against an upper surface of the recoater rail; and
       a third jack screw mounted to the second flange, wherein the second and third jack screws are spaced apart from each other and extend parallel to the body; and
    securing the revised mounting bracket to the recoater rail and the frame member with the recoater rail between the first and second jack screws.

11. The method of claim 10 wherein the first and second jack screws are oriented coaxial to each other.

12. The method of claim 10 wherein the first, second, and third jack screws are oriented parallel to each other.

13. The method of claim 10 wherein the first jack screw is disposed halfway between the second and third jack screws.

14. The method of claim 10 wherein the revised mounting bracket further comprises at least one female threaded rail mounting hole formed through the body.

15. The method of claim 10 wherein the revised mounting bracket further comprises frame mounting slots formed in the body.

16. The method of claim 10 wherein the recoater rail has first and second ends, the first end being received between the jack screws of the revised mounting bracket.

17. The method of claim 16 wherein the second end of the recoater rail is pivotally mounted to a first frame member of the additive manufacturing machine.

* * * * *